United States Patent
Wang et al.

(10) Patent No.: US 6,180,738 B1
(45) Date of Patent: Jan. 30, 2001

(54) PRODUCTION OF A STICKY POLYMER USING AN IMPROVED CARBON BLACK

(75) Inventors: Weidong Wang, Piscataway; Kevin Joseph Cann, Rocky Hill, both of NJ (US)

(73) Assignee: Union Carbide Chemicals & Plastics Technology Corporation, Danbury, CT (US)

( * ) Notice: Under 35 U.S.C. 154(b), the term of this patent shall be extended for 0 days.

(21) Appl. No.: 09/342,706

(22) Filed: Jun. 29, 1999

(51) Int. Cl.$^7$ ........................................................ C08F 2/34
(52) U.S. Cl. ..................... 526/200; 526/89; 526/901; 526/916; 526/348; 526/335; 526/160; 526/948; 526/171; 502/417
(58) Field of Search ................. 526/89, 200, 901, 526/916, 348, 335, 160, 943, 171; 502/417

(56) References Cited

U.S. PATENT DOCUMENTS

| | | | |
|---|---|---|---|
| 4,994,534 | * 2/1991 | Rhee et al. | 526/88 |
| 5,086,132 | 2/1992 | Joyce | 526/74 |
| 5,162,463 | * 11/1992 | Baker et al. | 526/74 |
| 5,200,477 | 4/1993 | Baker et al. | 526/74 |
| 5,304,588 | * 4/1994 | Boysen et al. | 523/204 |
| 5,453,471 | 9/1995 | Bernier et al. | 526/68 |
| 5,652,304 | 7/1997 | Calderon et al. | 526/142 |
| 5,858,903 | 1/1999 | Sylvester et al. | 502/118 |
| 5,877,109 | 3/1999 | Reichert et al. | 502/117 |

FOREIGN PATENT DOCUMENTS

| | | |
|---|---|---|
| 0657647A1 | 6/1995 | (EP) . |
| WO 9604322 | 2/1996 | (WO) . |
| WO 9604323 | 2/1996 | (WO) . |
| WO 98/34960 | * 8/1998 | (WO) . |
| WO 9834960 | 8/1998 | (WO) . |

OTHER PUBLICATIONS

Article, M. Gajewski and T. Prot, Radom (Poland), KGK Kautschuk Gummi Kunststoffe 47, Jahrgang, Nr. Aug. 1994, "Correlation Between Crosslink Densty And Properties of Rubber Containing Chemically Modified Carbon Black" pp. 574–577.

Article, M. Gajewski, H. Jankowska, A. Swiatkowski, S. Zietek, Proc. Int. Rubber Conf. 1979 Venice, Italy Oct. 3–6, 1979, Chemical Modficiation Of The Surface Of Carbon Black With The Aid Of The Sulfurating Agents And Its Influence On The Process Of Reinforcing Of Amorphous Polyenes, pp. 101–110.

Article, M. Gajewski, Nesz Nauk–Wyzszeo Szkoly Inzynierskiej W Radomiu Materialoznawstwo Chemiczne I Technologia Obuwia NR 12, Wlasciwosci Usieciowanych Polienow Zawierajacych Sadze Aktywna O Powierzchni Zmodyfikowanej Chemicznie ZA Pomoca Donorow Siarki, 1989, pp. 87–100.

* cited by examiner

*Primary Examiner*—David W. Wu
*Assistant Examiner*—R. Harlan
(74) *Attorney, Agent, or Firm*—B. L. Deppenbrock; R. C. Brown

(57) ABSTRACT

There is provided a polymerization, especially a gas phase polymerization, of a sticky polymer in the presence of a catalyst under polymerization conditions using carbon black as an inert particulate material, the improvement comprises conducting said polymerization in the presence of a carbon black having a sugar-containing or sugar-derived binder, which carbon black is prepared by heating the carbon black to a temperature of at least about 280° C. for a time sufficient to decompose said sugar-containing or sugar-derived binder prior to polymerization.

10 Claims, 1 Drawing Sheet

DEAC consumption as a function of treatment temperature for N650 from carbon black supplier A and supplier C.

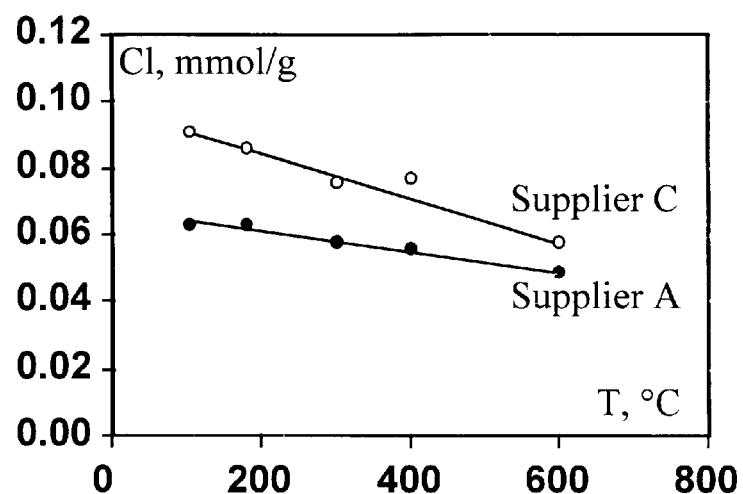
Figure 1. DEAC consumption as a function of treatment temperature for N650 from carbon black supplier A and supplier C.

US 6,180,738 B1

PRODUCTION OF A STICKY POLYMER USING AN IMPROVED CARBON BLACK

FIELD OF THE INVENTION

The invention relates to the use of carbon black, an inert particulate material, in the production of EPDM and other sticky polymers in a polymerization process. More particularly, the present invention relates to the production of sticky polymers in a polymerization process (especially a gas phase process) by heat-treating a carbon black having a sugar-containing or sugar-derived binder in order to lower the consumption of one or more catalyst components.

BACKGROUND OF THE INVENTION

It has been disclosed that sticky polymers such as ethylene/propylene/diene monomer (EPDM) and polydienes such as polybutadiene (BR), polyisoprene (IR), and styrene-butadiene rubber (SBR) can be produced in gas phase polymerization processes. Such processes are disclosed, for example, in U.S. Pat. Nos. 4,994,534; 5,304,588; 5,453,471; 5,652,304; 5,858,903; 5,877,109; EP 0 657 647; and WO 96/04322 and 04323.

In general, a sticky polymer is defined as a polymer being particulate at temperatures below the sticking or softening temperature but forming agglomerates at temperatures above its sticking or softening temperature. U.S. Pat. Nos. 4,994,534 and 5,304,588 have taught that sticky polymers, such as EPDM and polybutadiene (BR), can be produced in a gas phase polymerization at or above the sticking or softening temperature of the polymer being produced in the presence of a polymerization catalyst when an inert particulate material is used. In the gas phase reactor, the inert particulate material serves to continually coat the surfaces of sticky polymer that is forming, thereby maintaining the bed of forming polymer in a fluidized state. And since the surfaces of the resin produced become non-sticky, they are free-flowing for ease in handling and subsequent formulating or compounding, and readily bulk shippable. Inert particulate materials have been selected from the ingredients employed in rubber formulations and compounding and include carbon black, silica, talc, clay, activated carbon black, modified carbon black, and mixtures thereof The preferred inert particulate materials are carbon black, silica, and mixtures thereof, with a carbon black being the most preferred inert particulate material in gas phase processing.

Carbon black is the primary choice of inert particulate material (also sometimes referred to fluidization aid or flow aid). That is because carbon black aids in the prevention of agglomeration during polymerization and as well as in post reactor processing. And, more importantly, it is almost always employed as a reinforcing/partitioning agent/filler in compounding so its use does not introduced a new ingredient into compounding and/or the final molded or extruded article (e.g., tire (sidewall and/or tread), roofing, or hose). And, its presence ab initio as part of the polymer results in many mixing advantages in compounding—faster, simpler, less labor, cost reductions, etc.

U.S. Pat. Nos. 5,162,463 and 5,200,477 disclose the surface treatment of an inert particulate material such as carbon black with a PDMS (polydimethylsiloxane), PMHS (polymethylhydrogensiloxane), AM-DDMS (alkyl-modified polydimethylsiloxane), or OM-PDMS (an organo-modified polydimethylsiloxane). The inert particulate materials are treated with these compounds to prevent agglomeration and/or reduce stickiness of sticky polymers in the polymerization system.

More recently, it has been disclosed in WO 98/34960 that a "modified carbon black" can be employed for these purposes. A "modified carbon back" is defined on pages 4–5 of the reference. For the most part, this definition defines a modified carbon black as a silicon-treated or silica-coated carbon black or a carbon black having an attached organic group(s). The organic group can be attached via the reaction of a diazonium salt with a carbon black to impart water dispersibility. Other organic groups, according to the reference can include attached aromatic sulfide and aminophenyl groups. It is further suggested in this reference that the use of these modified carbon blacks in a gas phase polymerization will produce a polymer product containing them which, in turn, will result in an article (e.g., hose or tire) having improved properties. Gas phase polymerizations employing these modified carbon blacks and the suggested improvements are not demonstrated.

From the above discussion, it can be seen that the properties of the inert particulate materials can influence the ability to coat the forming polymer and the fluidizability of the bed of the forming polymer. However, the introduction of carbon black as a fluidization aid in a polymerization such as a gas phase polymerization, for example, brings with it a significant problem from a commercial perspective. The use of carbon black can greatly affect the polymerization catalyst.

However, WO 98/34960 does not address the problems discovered and solved by the inventors of this invention. In the present invention, the inventors have found that carbon black, including modified carbon blacks, undesirably consume large amounts of organoaluminum compounds (e.g., co-catalyst). That is, much more co-catalyst is employed than is required for the metal catalyst precursor. It is believed that this additional amount of co-catalyst is consumed in scavenging surface active groups located on the carbon black that can serve as catalyst poisons. Hence, for a gas phase process, the internal surfaces of the gas phase system and the carbon black itself is either pretreated with the same or different co-catalyst employed in the polymerization. Or, alternatively, increased quantities of co-catalyst are utilized during the polymerization itself. There is a need to make the production of sticky polymers more cost-effective by reducing the usage of co-catalyst (organoaluminum compounds).

Thus, for these reasons, there needs to be provided an improved polymerization process and an improved carbon black that not only can coat the forming polymer in the gas phase reactor so that it is fluidizable, but also be one that does not readily consume large amounts of organoaluminum compounds (e.g., co-catalyst). That is, there is a need for an inert particulate material such as a carbon black that improves the activity of the polymerization catalyst by providing a gas phase, solution, slurry, or bulk polymerization which utilizes smaller amounts of catalyst, and especially cocatalyst, so as to result in a commercially more cost effective gas phase polymerization process.

SUMMARY OF THE INVENTION

There is provided, in a polymerization of a sticky polymer in the presence of a catalyst under polymerization conditions using carbon black as an inert particulate material, an improvement which comprises conducting said polymerization in the presence of a carbon black having a sugar-containing or sugar-derived binder, which is prepared by heating the carbon black to a temperature of at least about 280° C. for a time sufficient to decompose said binder prior to the polymerization. There is also provided an improved carbon black prepared by heating a carbon black having a sugar-containing or sugar-derived binder to a temperature of at least about 280° C. for a time sufficient to decompose said binder.

BRIEF DESCRIPTION OF THE DRAWING

FIG. 1 depicts DEAC consumption as a function of treatment temperature for carbon black.

DETAILED DESCRIPTION OF THE INVENTION

Improved Carbon Black.

Carbon blacks suitable for treatment can be obtained commercially or prepared using well-known processes and techniques such as those taught in PCT/US98/02518. Typically, such carbon blacks are produced in a modular or staged furnace carbon black reactor. To produce carbon black in such a reactor, hot combustion gases are generated in a combustion zone by contacting a liquid or gaseous fuel with a suitable oxidant stream such as air, oxygen, or a mixture thereof. Among fuels suitable for use in contacting the oxidant stream in the combustion zone of the reactor to generate the hot combustion gases are included any readily combustible gas, vapor of liquid streams such as natural gas, hydrogen, methane, acetylene, alcohols, or kerosene. Generally, fuels having a high content of carbon-containing components (e.g., hydrocarbons) are used. Carbon blacks can be produced by the pyrolysis or partial combustion of any liquid or gaseous hydrocarbon usually from petroleum refinery sources such as decanted oils from catalytic cracking operations or by-products from coking operations and olefin manufacturing operations. The feedstock is converted (e.g., pyrolyzed) to carbon black and the carbon black particles formed are quenched (usually with water). After quenching, the carbon black is cooled and recovered by conventional means known to those skilled in the art. Recovered carbon black can optionally be subjected to a pelletization step.

Carbon black is classified as a solid material and is developed initially in the form of an aerosol. For this reason, carbon black just formed has a flocculent appearance which also gives rise to the expression "fluffy" carbon black or carbon black "fluff". The fluff form of carbon black is composed of more than 96% finely dispersed carbon black with small amounts of oxygen, hydrogen, nitrogen, sulfur and traces (less than 0.5%) organic components. However, the fluff form of carbon black poses difficulty in dispersing, handling, and transporting. The difficulty worsens when these processes are conducted under elevated pressures. Because of this, manufacturers of carbon black further process carbon black fluff to provide it to consumers in the form of dispersions, powders, beads, or pellets.

When carbon black fluff is converted to one of these latter forms (powders, beads, pellets), it is contacted with a water and/or a binder material. Binder is used in carbon black manufacturing to densify the fluff into beads or pellets. Many different materials have been employed by carbon black manufacturers as binders. One of these is to convert carbon black fluff to beads and/or pellets by contacting the carbon black fluff with a binder containing sugar or a sugar derivative. The sugar-containing binder is a mono- or di-saccharide such as glucose, fructose, galactose, maltose, sucrose, corn syrup, molasses, and mixtures thereof. The binder can also be a sugar derivative (aka "sugar-derived), such as one derived from sugar cane. Sugar-derived binders can include calcium lignosulfonate (CLS), ammonium lignosulfonate (ALS), and mixtures thereof. Preferred, for the present invention is a carbon black fluff contacted with a sugar-containing or sugar-derived binder of corn syrup, ALS, CLS, molasses, and mixtures thereof The most preferred is corn syrup. Corn syrup is the hydrolysis product of corn starch. It is produced by using an acid or an enzyme which is readily commercially available and is the product of a polysaccharide breakdown.

Carbon black fluff is combined with a binder material in a suitable diluent. To prepare the coated carbon black, a binder such as sugar-containing compound such as corn syrup may be diluted with a suitable diluent or solvent. The diluent can be alcohol, water or a combination of the two to produce a mixture or solution having a concentration of between about 0.1 and 20% by weight of the binder compound. The solution is added into carbon black, preferably slowly and dropwise or sprayed.

After the carbon black manufacturer contacts the carbon black fluff with the binder and beads or pellets are formed, the bead or pellet form is dried at temperatures up to about 250° C. Heating at these low temperatures (up to 250° C.) does not remove the sugar-containing binder from the carbon black.

This after-treatment can produce carbon black beads containing up to 15% oxygen. Also, depending on the wash or binder used, after-treated carbon black typically contains higher amounts of other contaminants (e.g., hydrogen, nitrogen, sulfur, moisture). The use of binders, surface active groups or other contaminants associated with these forms of carbon black result in the high consumption or organoaluminum co-catalyst in gas phase polymerizations.

Before carbon black in bead or pellet form are utilized in a gas polymerization process, the polymer manufacturer may subject them to a grinding process which in turn can introduce additional impurities such as moisture and traces of metals into the ground carbon black powder. Even though the particle and powder forms consume more co-catalyst (or aluminum alkyl or aluminum alkyl hydride), the polymer manufacturer uses carbon black powder in gas phase polymerization because it is a better fluidization aid than the beads. In general, these carbon black materials employed have a primary particle size of about 10 to 100 nanometers and an average size of aggregate (primary structure) of about 0.1 to about 10 microns. The specific surface area of the carbon black is about 30 to 1,500 m2/gm and displays a dibutylphthalate (DBP) absorption of about 80 to 350 cc/100 grams.

In the present invention, the carbon black having a sugar-containing or sugar-derived binder is heated to a temperature of at least about 280° C. (preferably about 300 to 600° C.) for a time sufficient to remove said sugar-containing binder and/or other impurities. This higher temperature heating can be accomplished at any time prior to utilizing the carbon black in a gas phase polymerization. It can take place immediately after the carbon black fluff and binder are formed into beads or pellets by the manufacturer. Or, the beads and/or pellets of carbon black and binder can be heated prior to being ground by the polymer producer. Alternatively, after the pellets or beads of carbon black with the binder have be subjected to grinding, for example, by the polymer producer, the particles can be subjected to heating at a temperature of at least about 280° C. Heating a carbon black containing a sugar-containing binder and/or a sugar-derived binder to a temperature $\geq 280°$ C. results in a reduction of co-catalyst consumption of at least 10 to 30% or even greater. Hence, this heating can significantly reduce gas phase production costs and/or boost catalyst activity. And, accordingly, there is provided an improved carbon black, particularly useful for gas phase polymerizations, prepared by heating a carbon black having a sugar-containing or sugar-derived binder to a temperature of at least about 280° C. for a time sufficient to decompose said binder.

Polymerization Processes.

The improved or treated carbon black as described above can be employed in any polymerization process utilized for the production of a sticky polymer in the presence of a polymerization catalyst. Such processes can include solution, slurry, bulk, and gas phase processes. Solution, slurry, and bulk processes are well known and disclosed, for example, in U.S. Pat. Nos. 3,386,983; 3,458,490; 3,770,710; 4,098,980; 4,452,960; 5,086,132; and EPO 011184. In such processes, the improved carbon black is mixed with one or more of the other ingredients, as disclosed, for example, in U.S. Pat. No. 5,086,132.

Preferably, a gas phase polymerization process is employed to produce a sticky polymer. The sticky polymers are produced by a gas phase process employing a fluidized bed with or without mechanical assistance or stirring. Gas phase processes including the so-called "conventional" gas phase processes, "condensed-mode," and, most recent, "liquid-mode" processes can be employed. It is preferred that these processes be conducted at temperatures at or above the sticking or softening temperature of the polymer being formed. In these processes, it is desirable to include a scavenger in the reactor to remove adventitious poisons such as water or oxygen before they can lower catalyst activity.

Conventional fluidized processes are disclosed, for example, in U.S. Pat. Nos. 3,922,322; 4,035,560; 4,994,534; 5,304,588; and 5,317,036. Condensed mode polymerizations, including induced condensed mode, are taught, for example, in U.S. Pat. Nos. 4,543,399; 4,588,790; 4,994,534; 5,304,588; 5,317,036; 5,352,749; and 5,462,999. Liquid mode or liquid monomer polymerization mode is described in U.S. Pat. No. 5,453,471; WO 96/04322 (PCT/US95/09826); and WO 96/04323 (PCT/US95/09827). Other processes that can be employed are disclosed in U.S. Pat. Nos. 5,652,304; 5,858,903; 5,877,109; and EP 0 657 647. For diolefin (e.g., butadiene) polymerization, it is preferable to use liquid mode and to employ an inert particulate material, a so-called fluidization aid or flow aid.

When the improved carbon blacks of the invention are employed as fluidization aids, they are used in amounts ranging from about 0.3 to about 80% by weight, preferably about 5 to 60%, most preferably 10 to 45%, based on the weight of the polymer produced.

The improved carbon black fluidization aid of the invention can be added to the reactor separately or mixed with all or a portion of one or more of the monomers and/or catalyst. It is generally preferred to add the improved carbon black separately to the reactor. Improved carbon black can be introduced into the reactor at or near the top of the reactor, at the bottom of the reactor, or to the recycle line directed into the bottom of the reactor. Preferably, the heat-treated or improved carbon black is introduced at or near the top of the reactor or above the fluidized bed. It is preferred to treat (i.e., dry) the fluidization aid prior to entry into the reactor to remove traces of moisture and oxygen.

The use of improved carbon black as fluidization aids in polymer polymerization produces a polymer having a core-shell configuration such as that disclosed in U.S. Pat. No. 5,304,588. These polymer particles are granular and free-flowing upon exiting the reactor and are produced by a fluidized bed polymerization process at or above the softening point of the sticky polymer.

The polymerizations can be carried out in a single reactor or multiple reactors, typically two or more in series, can also be employed. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed a reaction zone.

Generally, all of the above modes of polymerizing are carried out in a gas phase fluidized bed containing a "seed bed" of polymer which is the same or different from the polymer being produced. Preferably, the bed is made up of the same granular polymer that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, isopentane) and, if desired, modifiers (e.g., hydrogen). Thus, during the course of a polymerization, the bed comprises formed polymer particles, growing polymer particles, catalyst particles, and optional flow aids (fluidization aids) fluidized by polymerizing and modifying gaseous components introduced at a flow rate or velocity sufficient to cause the particles to separate and act as a fluid.

In general, the polymerization conditions in the gas phase reactor are such that the temperature can range from sub-atmospheric to super-atmospheric, but is typically from about 0 to 120° C., preferably about 40 to 100° C., and most preferably about 40 to 80° C. Partial pressure will vary depending upon the temperature of the polymerization, and it can range from about 1 to 300 psi (6.89 to 2,067 kiloPascals), preferably 1 to 100 psi (6.89 to 689 kiloPascals). The condensation temperature of butadiene is well known. In general, it is preferred to operate at temperatures slightly above to slightly below (that is, for example, ±10° C. for butadiene and/or isoprene) the dew point. Preferably, the gas phase process is conducted in a continuous gas phase reactor or a semibatch gas phase reactor in the presence of an treated carbon black under reaction conditions such that at least a portion of the monomer is maintained at or below its dew point temperature.

Dienes when employed in the production of sticky polymers can include: conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, 7-methyl-1,6-octadiene (MOD), vinylcyclohexene, dicyclopentadiene, butadiene, isobutylene, isoprene, ethylidene norbornene (ENB), and the like. For sticky polymers such as EPDM, ENB, MOD, 1,5-hexadiene, and dicyclopentadiene are most preferred.

In general, the polymerization catalyst employed in these processes can contain a precursor, organoaluminum cocatalyst, and promoter (optional). It can be supported (on an inert carrier material such as carbon black, silica, magnesia, alumina, and/or activated carbon) or unsupported (as a liquid or in a slurry, solution, or emulsion). The catalyst can be in the form of a prepolymer or spray dried (with or without a filler material). Typical catalysts precursors can include (i) a compound employing a metallocene (e.g, containing a metal selected from the group consisting of titanium, hafnium, and zirconium, and mixtures thereof) and other single site catalysts; (ii) a compound employing a transition metal selected from the group consisting of titanium, vanadium, cobalt, nickel, and mixtures thereof; (iii) a compound containing a rare earth metal (the Lanthanides, e.g., neodymium), and (iv) an anionic initiator such as alkyl lithium (e.g., butyl lithium). Mixtures of these catalysts can also be employed.

When a catalyst support is employed, it can be impregnated with one or more of the individual catalyst components (precursor, cocatalyst, promoter). Generally, the catalyst precursor is impregnated and the other components are introduced separately into the polymerization. If used, the support can be silica, alumina, carbon black, activated carbon, or polymeric material with silica being the most preferred. Examples of polymeric supports are porous crosslinked polystyrene and polypropylene. A typical silica or alumina support is a solid, particulate, porous material essentially inert to the polymerization. It is used as a dry powder having an average particle size of about 10 to about 250 microns, preferably about 30 to 100 microns; a surface area of at least 200 square meters per gram, preferably at least about 250 square meters per gram; and a pore size of at least about 100 Angstroms, preferably at least about 200 Angstroms. Impregnation of the catalyst precursor or other component of the catalyst system onto a support such as silica is well known and can be accomplished, for example, by mixing the precursor and silica gel in an inert solvent followed by solvent removal under reduced pressure.

Unreacted monomer including unreacted diene encountered in gas phase processes can be purged by known methods such as those described, for example, in U.S. Pat. Nos. 4,758,654; 5,191,062; 5,292,863; 5,478,922; 5,688,910; and U.S. Ser. No 09/098,479.

Polymers.

The polymers produced by the invention are designated as "sticky polymers." Sticky polymers are defined in U.S. Pat. Nos. 4,994,534 and 5,304,588. A sticky polymer is defined as a polymer which, although particulate at temperatures below the sticking or softening temperature, agglomerates at temperatures above such temperature. The agglomeration may be spontaneous or occur on settling. A polymer may be inherently sticky due to its chemical or mechanical properties or pass through a sticky phase during the production cycle. Although many variables influence the degree of stickiness of the polymer, it is predominantly governed by the temperature (sticking) and the crystallinity of the resin. Higher temperature of the resin increases stickiness. Less crystallinity, or conversely more amorphous or elastomeric the resin, the greater the tendency to agglomerate or stick. In general, a sticky polymer has a density of less than 0.915 when produced at temperatures above its melting/softening temperature.

Examples of polymers having some or all of these characteristics can include, but are not limited to, ethylene-propylene rubbers (EPRs), ethylene-propylene-diene rubbers (EPDMs) in which the diene is selected, for example, from the group consisting of ethylidene norbornene, hexadiene, methyloctadienes, polydienes such as polybutadiene and polyisoprene, very low density polyethylene (VLDPE), amorphous or elastomeric polypropylene homo- and co-polymers, poly(1-butene), very low density (low modulus) polyethylenes such as ethylene butene rubbers or hexene containing terpolymers, and vinyl-aromatic polymers.

The use of inert particulate materials (e.g., carbon black) as fluidization aids in a polymerization (especially gas phase polymerizations) typically produces a polymer having a core-shell configuration such as that disclosed in U.S. Pat. No. 5,304,588. Typically the polymer particle has a mass of polymer in its core and a shell comprising improved carbon black and/or a mixture of polymer and improved carbon black. However, this is not the only possible configuration especially for particles produced, for example, in non-gas phase processes. It should be understood that the polymer particle does not necessarily have to have a core shell configuration but rather the carbon black can be distributed throughout the particle. The polymer particles produced by the process of the invention comprise polymer and improved carbon black. The particles produced by the process and/or particles of the invention are granular and free-flowing. The polymer particles so produced can be used to make molded and extruded articles such as tires, roofing material, and cable.

All references cited herein are incorporated by reference.

Whereas the scope of the invention is set forth in the appended claims, the following examples illustrate certain aspects of the present invention. The examples are set forth for illustration and are not to be construed as limitations on the invention except as set forth in the claims. All parts and percentages throughout the application are by weight unless stated otherwise.

EXAMPLES

Procedure for measuring aluminum alkyl consumption by carbon black.

A carbon black sample was dried in a vacuum at 180° C. for 4 hours before being treated with an excess amount of di-ethylaluminum chloride (DEAC). In a typical experiment, 3 g of CB was treated with 1.5 mmol DEAC in 50 ml hexane in a dry nitrogen atmosphere and stirred for 30 minutes at room temperature. The sample was centrifuged, decanted, and washed with hexane three times and dried in vacuum. DEAC consumption was determined by chlorine analysis of CB with silver nitrate. The results are presented in this invention as mmol of chlorine per gram of carbon black.

Procedure for charring binder on carbon black.

Carbon black containing wet binder was pre-dried in a Vapor-Rotor(®) in a vacuum at 80° C. to remove the moisture. The pre-dried carbon black (10 g) was put in a 10 cm quartz tube, in which either nitrogen or air was used, and the quartz tube was heated in a furnace to a desired temperature (e.g. 280° up to 500° C., typically about 300° C.) to decompose the binder material.

Example 1

Contribution of carbon black binder to the aluminum alkyl consumption by carbon black. A comparison of aluminum alkyl consumption by carbon black fluff and pelletized carbon black bead shows clearly the contribution of carbon black binder to the aluminum alkyl consumption. Carbon black fluff has low bulk density carbon dust, which does not contain any binder. The bead form carbon black was obtained by densifing fluff carbon with binders. The samples are N330, N550, and N650 from US and Europe plants of carbon black Suppliers A and B. The result of consumption of di-ethyl aluminum chloride (DEAC), a widely used co-catalyst, by the carbon blacks is shown in Table I. It can be seen that the carbon black beads always consume higher aluminum alkyl levels than that of fluff. This difference can be attributed to the presence of binder in carbon black beads, even though some of binder was decomposed by high temperature during carbon black post treatment by the manufacturer. The binders used in these carbon blacks are ALS (ammonium lignosulfonate) and a corn syrup, which are rich in oxygen functional groups and can react with a catalyst component like DEAC.

The effect of charring temperature of carbon black binder on DEAC consumption differs from CB supplier due to the different binder used. FIG. 1 shows the DEAC consumption by CB N650 from Supplier A and Supplier C as a function of charring temperature. In this experiment, 10 g of carbon black was put into a 10 cm quartz tube and heated to the desired temperature. The DEAC consumption decreased with the temperature for both CBs and supplier C always has a high value over the entire temperature range. This difference may be caused by CB binder used by two CB manufacturers.

Example 2

Effect of carbon black on cocatalyst consumption.

This work found that the type, concentration of carbon black binder, and the post treatment of carbon black with binder affected the catalyst component consumption. The effect of the presence of binders on cocatalyst consumption has been demonstrated by incorporating different binder levels into carbon black and determining their reactivity with aluminum alkyl. In this example, aqueous binder solution was added into carbon black beads with stirring. The amount of binder solutions were 1, 2, 5 and 10% by weight based on carbon black weight. After the binder was incorporated into the carbon black, the carbon black was pre-dried in a Vapor-Rotor in vacuum at 80° C. and charred at the desired temperature. The results in Table II summarize cocatalyst consumption of binder incorporated carbon black dried at 180° C. in vacuum. (This will remove the moisture with the minimum charring of the binder). The results indicated that the uncharred binders can react with aluminum alkyl and there was similar effect for all these binders.

Example 3

Effect of charring temperature on cocatalyst consumption by carbon black.

Higher drying temperature was found to lower aluminum alkyl consumption by carbon black. Carbon black N650 beads were incorporated with 0.3% (weight percent) sugar binder, pre-dried in a Vapor-Rotor in vacuum at 80° C., and charred at 125, 150, 180 and 600° C. in nitrogen with the method described above (Table III). At the higher charring temperature (600° C.) significant reduction was found in cocatalyst consumption.

Example 4

Effect of binder type on cocatalyst consumption.

The catalyst component consumption by carbon black also depended on the binder type and binder charring conditions. Binder incorporated carbon blacks were treated at mild (250° C. in air) and high temperatures (550° C. in $N_2$). Their alkyl demands were compared in Table IV. It was obvious that at mild temperature treatment, carbon black with sugar type binders had the lowest catalyst demand among these binders. At high temperature treatment, sugar binder and ALS binder lead to the lowest alkyl demand. This result was related with the thermostability of binders. Sugar binder was effectively removed by decomposition, even at relatively mild temperature, while ALS binder required a high temperature. The other binders, however, have relatively high residue content which resulted in the high cocatalyst consumption.

TABLE I

Consumption of di-ethyl aluminum chloride by the carbon blacks, in mmol/g

| C.B. | Fluff | Bead | Binder | Supplier |
|---|---|---|---|---|
| N330 | 0.086 | 0.106 | ALS | CB Supplier, A |
| N550 | 0.058 | 0.085 | ALS | CB Supplier, A |
| N550 | 0.065 | 0.120 | unknown | CB Supplier, B |
| N650 | 0.060 | 0.100 | unknown | CB Supplier, B |
| N650 | 0.043 | 0.054 | Corn syrup | CB Supplier, A |

* ALS: Ammonium lignosulfonate

TABLE II

Consumption of di-ethyl aluminum chloride by the carbon blacks, in mmol/g

| Binder | Binder incorporated | | | |
|---|---|---|---|---|
|  | 1% | 2% | 5% | 10% |
| Sugar | 0.123 | 0.146 | 0.181 | 0.272 |
| Molasses | 0.104 | 0.119 | 0.196 | 0.293 |
| CLS | 0.139 | 0.151 | 0.233 | 0.279 |
| ALS | — | — | 0.219 | — |

* CLS: Calcium lignosulfonate
* ALS: Ammonium lignosulfonate

TABLE III

Effect of charring temperature on catalyst consumption, (carbon black N650 containing 0.3% sugar binder), in mmol/g

| Treatment T, ° C. | DEAC demand |
|---|---|
| 125 | 0.091 |
| 150 | 0.089 |
| 180 | 0.083 |
| 600 | 0.040 |

TABLE IV

Effect of drying temperature of carbon black with different binder on cocatalyst consumption, in mmol/g

| Binder | uncharred | 250° C. in air | 550° C. in $N_2$ |
|---|---|---|---|
| Sugar | 0.181 | 0.147 | 0.091 |
| Molasses | 0.196 | 0.170 | 0.153 |
| CLS | 0.233 | 0.172 | 0.138 |
| ALS | 0.219 | 0.188 | 0.089 |

What is claimed is:

1. A process for the production of a sticky polymer in the presence of a catalyst under polymerization conditions using carbon black as an inert particulate material, the improvement which comprises conducting said polymerization in the presence of a carbon black having a sugar-containing or sugar-derived binder which is prepared by heating the carbon black to a temperature of at least about 280° C. for a time sufficient to decompose said binder prior to polymerization.

2. The process of claim 1 wherein said improved carbon black is present in an amount of from about 0.3 to 80 wt % based on the weight of the polymer product.

3. The process of claim 2 wherein the catalyst contains a metal selected from the group consisting of titanium, hafnium, zirconium, nickel, cobalt, lithium, vanadium, neodymium, and mixtures thereof.

4. The process of claim 1 wherein the polymer produced is selected from the group consisting of ethylene-propylene rubber, ethylene-propylene-diene, polybutadiene, and polyisoprene.

5. The process of claim 1 wherein improved carbon black has a sugar-containing binder wherein the binder is a mono- or di-saccharide selected from the group consisting of glucose, fructose, galactose, maltose, sucrose, corn syrup, molasses, and mixtures thereof or a sugar-derived binder selected from the group consisting of calcium lignosulfonate, ammonium lignosulfonate, and mixtures thereof.

6. The process of claim 1 wherein the polymerization is a gas phase polymerization.

7. An improved carbon black prepared by heating a carbon black having a sugar-containing or sugar-derived binder to a temperature of at least about 280° C. for a time sufficient to decompose said binder.

8. The improved carbon black of claim 7 wherein the sugar-containing binder is a mono- or di-saccharide.

9. The improved carbon black of claim 8 wherein the sugar-containing binder is a mono- or di-saccharide selected from the group consisting of glucose, fructose, galactose, maltose, sucrose, corn syrup, molasses, and mixtures thereof; and the sugar-derived binder is selected from the group consisting of calcium lignosulfonate, ammonium lignosulfonate, and mixtures thereof.

10. The improved carbon black of claim 9 wherein the mono- or di-saccharide is corn syrup.

* * * * *